Patented Apr. 13, 1926.

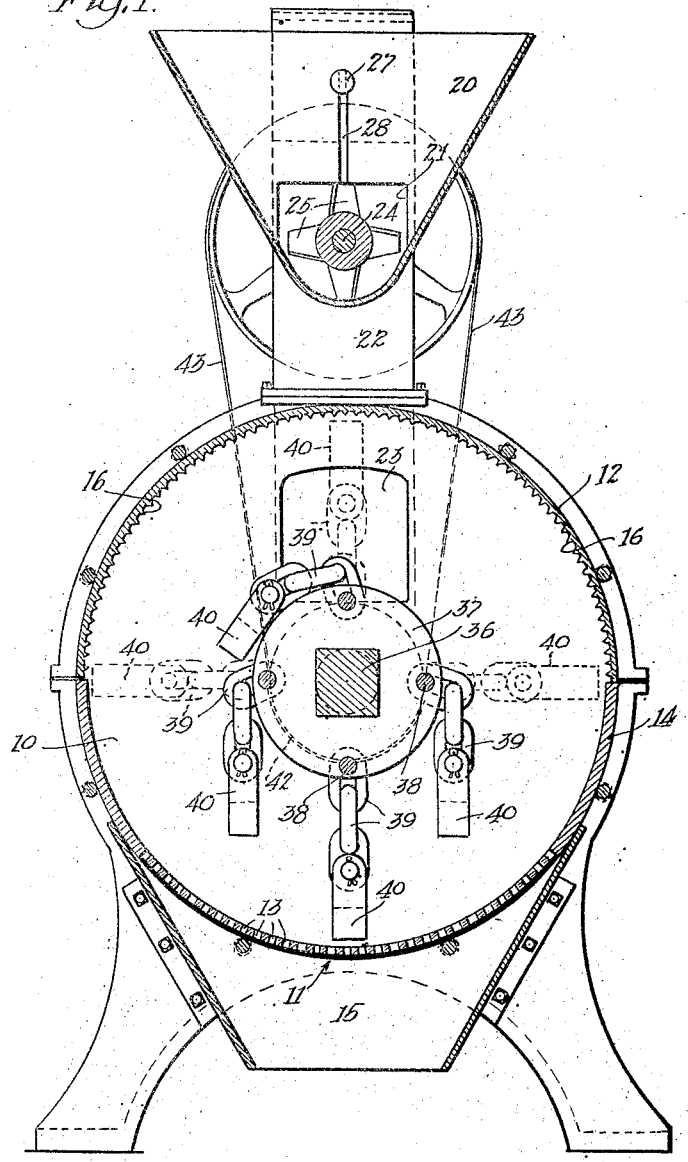

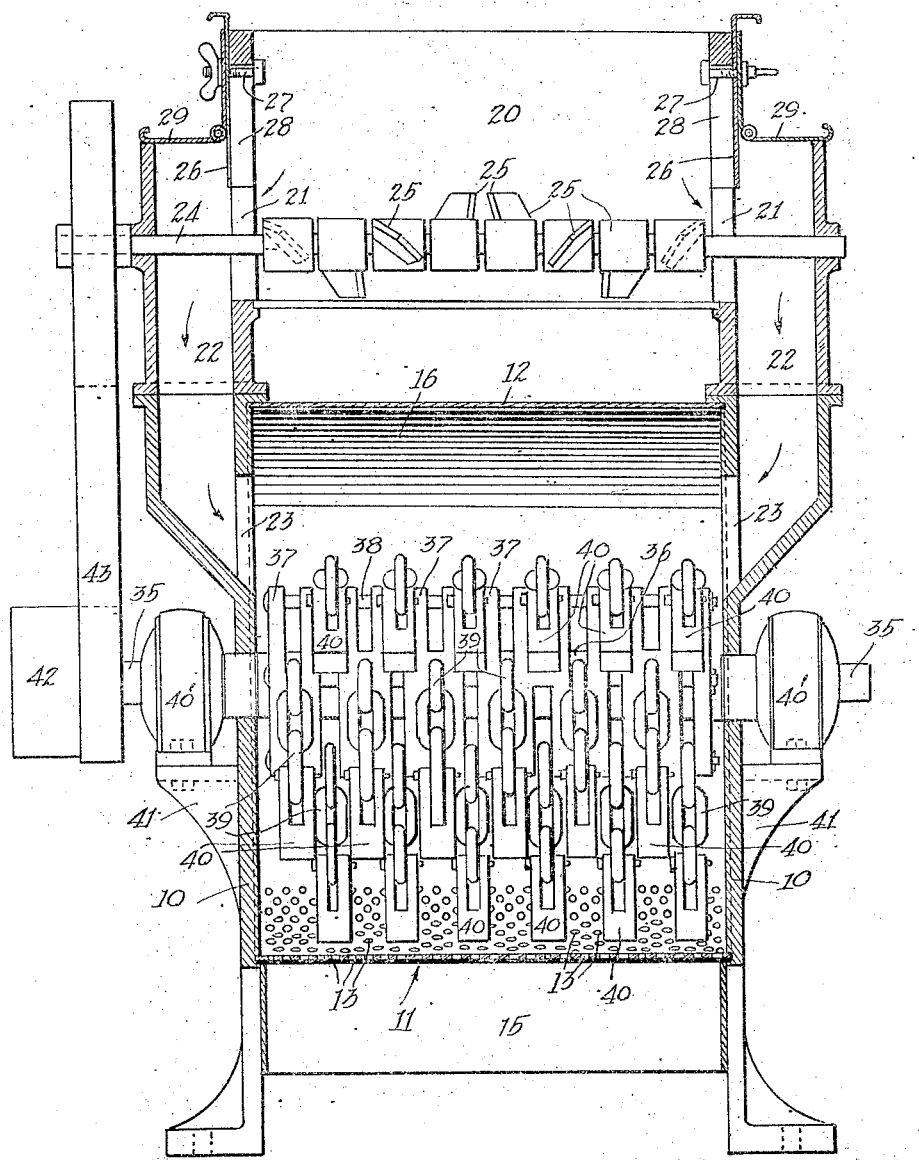

1,580,620

UNITED STATES PATENT OFFICE.

THOMAS L. McKAIN, OF LOS ANGELES, CALIFORNIA.

PULVERIZER.

Application filed May 24, 1922. Serial No. 563,350.

*To all whom it may concern:*

Be it known that I, THOMAS L. McKAIN, a citizen of the United States, residing at Los Angeles, in the county of Los Angeles, State of California, have invented new and useful Improvements in Pulverizers, of which the following is a detailed specification.

This invention relates to pulverizers for various kinds of materials; and although the device hereinafter described is not limited thereto, this particular embodiment of my invention has been designed especially for pulverizing relatively soft or easily breakable materials.

It is a general object of the invention to provide a simple and effective pulverizer at small cost and high capacity; one that is not liable to become clogged or liable to breakage, and one that has a long wearing life. These objects I accomplish with the combination and specific parts now to be described in a preferred embodiment; reference for this purpose being had to the accompanying drawings in which:

Fig. 1 is a vertical section of a pulverizer according to my invention; Fig. 2 is a longitudinal central vertical section of the same.

In the drawings I show a pulverizer drum made up of end plates 10, bottom 11 and top 12. Bottom 11 is perforated as shown at 13 throughout the lower part of its extent, the upper and side wall portions of the bottom 11 being unperforated; as shown in the drawings. A discharge spout 15 leads from the perforated portion of the bottom shell. The upper half shell 12 is longitudinally corrugated as indicated at 16, with ribs that extend longitudinally or axially of the device.

Above the drum there is a feed hopper 20 with feeding openings 21 at its opposite ends which discharge into chutes 22 that lead down to feed openings 23 in the side walls of the drum. In the feed hopper there is a shaft 24 carrying feeder members 25 which act in the well-known manner to feed the material lengthwise of the shaft. These feeder members are set at two opposite angles so that the material is fed from the center of the hopper toward its opposite ends and toward the two opposite openings 21. Adjustable gates 26 control the feed through openings 21. These gates are adjustable by means of adjustable bolts 27 that extend through slots 28 in the walls of the hopper. There are also hinged covers 29 for the chutes to enable access to be had to them if necessary or desirable.

A central shaft 35 extends axially through the drum and has within the drum a squared portion 36 upon which a number of spaced disks 37 are drivingly mounted. Through these spaced disks and near their peripheries are extended a plurality of spaced rods 38 shown here as four in number, but of course, they may be of any suitable number. These rods provide means for attaching chain links 39 in the manner clearly shown in the drawings. At the outer end of each chain there is loosely hung a beater 40 preferably made of some relatively hard material, as for instance, of hard cast iron or steel. The lengths of the chains are such that when the whole device is in rotation and the beaters are thrown out radially their outer ends will not quite touch the interior surface of the drum shell, as shown in dotted lines in Fig. 1. In both the figures the parts are shown in full lines in their position of rest. The chain links are loosely connected with rods 38 and lie more or less loosely between adjacent disks 37; so that the beaters have a great deal of flexibility. It will be apparent that they may drag behind a straight outward radial position; and it will also be understood that they may touch laterally (that is, in a direction parallel to the axis of the device) if they strike any mass that cannot be immediately broken at a single impact. And furthermore they can, to a certain extent twist the chain links also allowing a certain amount of flexibility in that regard. Thus as will be readily recognized, these beaters, when the device is in rotation, are comparatively flexible and can pass over or around any mass of material that cannot be immediately broken.

The bearings 40 for shaft 35 are supported on brackets 41 and located outside the pulverizer drum where they are not affected by the pulverized materials. This shaft may be driven through any suitable means as by a drive pulley 42: and a belt 43 may drive the feeder shaft 24 from pulverizer shaft 35.

When the pulverizer is in action material is fed into it in proper amounts to keep a certain amount always present in the drum. As the materials are pulverized they pass out through the perforations 13 and are discharged; but enough material will always be kept in the pulverizer to more or less cover its cylindrical wall, but not enough to prevent the beaters 40 from throwing out to or near their outermost portions. As the beaters revolve at considerable speed, they strike the masses and lumps of material and break them up. If a lump cannot be broken at once it will be struck successively by the beaters until it is broken up and pulverized. It will be noted that the beaters and their chains are arranged in staggered relation (see Fig. 2) so that the beaters not only strike the material and tend to drive it around the drum but also successive beaters tend to throw the material back and forth from side to side. There is thus no possibility of any material getting permanently out of the path of the beater.

As the material is acted upon by the beaters it is thrown around and carried around the interior of the drum; and the upper shell half of the drum becomes covered with the material as well as the lower shell half. This is particularly true of the material after it is beaten down more finely; and thus a considerable amount of the pulverization takes place against the corrugated upper part of the drum wall. I have found that making the upper part of the drum wall corrugated adds very greatly to the efficiency of the machine, both as to its capacity and as to getting a fine and uniform pulverization.

As the material is thrown around the periphery of the drum, and as it passes the perforated portion, the pulverized parts pass out. The size of the perforations of course, measures the maximum size of the particles; and therefore the size of the perforations will depend upon how fine a pulverization is desired.

Having described a preferred form of my invention, I claim:—

1. In a pulverizer of the character described, a drum, beaters rotatable within the drum around the axis thereof, said beaters when in rotation extending close to but not touching the inner surface of the drum; the lower part of the lower half of the drum cylindrical wall being perforated and the remaining parts of the lower half being imperforate and smooth surfaced, and the complete upper half of the drum cylindrical wall being corrugated with ribs that extend lengthwise of the drum.

2. In a pulverizer of the character described, a drum, beaters rotatable within the drum around the axis thereof, the complete upper half of the inner surface of the drum being unbrokenly corrugated, the drum having inlet openings for material at its ends; the lower central part of the lower half of the drum being perforated, for discharge of pulverized material, and the two parts of the lower drum half above the perforated part being imperforate and smooth surfaced to feed material down onto the perforated part.

In witness that I claim the foregoing I have hereunto subscribed my name this 5th day of May, 1922.

THOMAS L. McKAIN.